United States Patent
Schubert et al.

(10) Patent No.: US 11,235,702 B2
(45) Date of Patent: Feb. 1, 2022

(54) ARRANGEMENT OF ELECTRIC PIXEL MATRIX DISPLAY AND ROTARY ACTUATOR WITH IMPROVED LIGHT GUIDE

(71) Applicant: PREH GMBH, Bad Neustadt a. d. Saale (DE)

(72) Inventors: Michael Schubert, Coburg (DE); Haiko Glienicke, Schweinfurt (DE)

(73) Assignee: PREH GMBH, Bad Neustadt A.D. Saale (IL)

( * ) Notice: Subject to any disclaimer, the term of this patent is extended or adjusted under 35 U.S.C. 154(b) by 507 days.

(21) Appl. No.: 16/306,741

(22) PCT Filed: Jun. 26, 2017

(86) PCT No.: PCT/EP2017/065674
§ 371 (c)(1),
(2) Date: Dec. 3, 2018

(87) PCT Pub. No.: WO2018/001945
PCT Pub. Date: Jan. 4, 2018

(65) Prior Publication Data
US 2019/0126819 A1 May 2, 2019

(30) Foreign Application Priority Data
Jun. 30, 2016 (DE) .......................... 102016112028.6

(51) Int. Cl.
*B60Q 3/66* (2017.01)
*B60Q 3/10* (2017.01)
*G05G 1/10* (2006.01)

(52) U.S. Cl.
CPC ................ *B60Q 3/66* (2017.02); *B60Q 3/10* (2017.02); *G05G 1/105* (2013.01)

(58) Field of Classification Search
CPC .................................... B60Q 3/66; B60Q 3/10
See application file for complete search history.

(56) References Cited

U.S. PATENT DOCUMENTS

| 5,450,075 A | 9/1995 | Waddington |
| 2005/0204997 A1 | 9/2005 | Fournier |
| 2006/0207867 A1 | 9/2006 | Waddington |

FOREIGN PATENT DOCUMENTS

| CN | 101493543 A | 7/2009 |
| DE | 10255839 A1 | 7/2004 |

(Continued)

OTHER PUBLICATIONS

The International Search Report and The Written Opinion for PCT/EP2017/065674, dated Jan. 3, 2018, EPO, Rijswijk, The Netherlands.

(Continued)

*Primary Examiner* — Joseph L Williams
(74) *Attorney, Agent, or Firm* — M&B IP Analysts, LLC

(57) ABSTRACT

A device including: a rotary actuator; an electronic pixel matrix display comprising a transparent outer layer; wherein the rotary actuator comprises an actuating part and a detector configured to detect rotational position, wherein the actuating part is rotationally mounted by a bearing so that it can rotate about an axis of rotation along a rotation direction, and the rotary actuator is arranged on the transparent layer; and wherein the rotary actuator also comprises a light guide designed to guide light of several pixels of the pixel matrix display from a light inlet surface of the light guide to a light outlet surface of the light guide either in the direction of or into an illumination surface of at least one of the rotary actuator and the actuating part.

17 Claims, 3 Drawing Sheets

(56) References Cited

FOREIGN PATENT DOCUMENTS

DE   102010010574 A1   9/2011
GB       2376284 A   12/2002
WO     2012048852 A1   4/2012

OTHER PUBLICATIONS

The First Office Action from Chinese Patent Application No. 2017800323758 dated Dec. 31, 2019, CNIPA, China.

ARRANGEMENT OF ELECTRIC PIXEL MATRIX DISPLAY AND ROTARY ACTUATOR WITH IMPROVED LIGHT GUIDE

This application claims priority under 35 U.S.C. § 371 to the International Application No. PCT/EP2017/065674, filed Jun. 26, 2017, and to the German Application No. 10 2016 112 028.6, filed Jun. 30, 2016, now pending, the contents of which are hereby incorporated by reference.

The disclosed embodiment relates to an arrangement comprising a rotary actuator with means for detecting the rotational position and an electronic pixel matrix display comprising a transparent outer layer. The rotary actuator is arranged on the transparent layer in a rotationally movable manner by means of bearing means. Such an arrangement combination is becoming more and more popular because, on the one hand, various functions and functional instructions can be assigned to the rotary actuator due to the flexible display possibilities of the electronic pixel matrix display and, on the other hand, the rotary actuator with its actuating part provides a familiar haptic feedback and can easily be sensed by the driver without visual contact. Due to the arrangement of the rotary actuator on the generally horizontally or, with respect to the gravitational field, obliquely oriented, transparent layer of the electronic pixel matrix display, there is on the one hand the problem that the arrangement of illuminants to be supplied electrically on the transparent layer requires an undesirable structural change in the electronic pixel matrix display. On the other hand, the light intensity achieved by the electronic pixel matrix display is not sufficient to provide a perceptible luminous marking recognizable in particular under daylight conditions.

Against this background, there was a need for a solution in which the illumination of a rotary actuator arranged on an electronic pixel matrix display is improved without additional illuminants being provided in addition to the illuminants necessary for the pixel matrix display. This aim is achieved by an arrangement according to claim 1. An equally advantageous use is the subject matter of the use claim. Advantageous embodiments are respectively the subject matter of the dependent claims. It should be noted that the features stated separately in the claims may be combined in any technologically sensible manner and disclose further embodiments of the disclosed embodiment. The description, in particular in connection with the figures, further characterizes and specifies the disclosed embodiment.

The disclosed embodiment relates to an arrangement comprising a rotary actuator and an electronic pixel matrix display. The rotary actuator has an actuating part which is annular, for example, or configured as a hood or knob and which is rotationally mounted by bearing means about an axis of rotation. Means for detecting the rotational position, i.e., means that are suitable for detecting the position and/or the change in position of the actuating part, are also provided. For example, the bearing means comprise a sliding or rolling bearing, such as a ball bearing. The means for detecting the rotational position are preferably contactless, for example optical, detecting means. The arrangement comprises an electronic pixel matrix display comprising a transparent outer layer. The display is, for example, a backlit liquid-crystal display, for example in the TFT configuration, or a display in OLED design.

According to the disclosed embodiment, the rotary actuator is arranged on the transparent layer. The transparent outer layer is, for example, a plastic layer, preferably a surface-hardened plastic layer, in order to, for example, protect the underlying electrode structure of a capacitive sensor system or the polarization layer of the electrical display from damage. The transparent layer is, for example, a glass layer.

According to the disclosed embodiment, the rotary actuator further comprises a light guide which is designed to guide light of several pixels of the pixel matrix display from a light inlet surface of the light guide to a light outlet surface of the light guide in the direction of or into an illumination surface of the rotary actuator, in particular of the actuating part. The light of several pixels of the region of the pixel matrix display that is covered by the rotary actuator is preferably introduced into the light guide, wherein the light inlet surface of the light guide is arranged adjacently to these pixels. For example, the pixels are a group of a few to several decades, such as 2 to 50, pixels assigned to the light inlet surface, optionally in dependence upon the position of the light guide.

By using the light of the pixel matrix display for the position-dependent luminous marking, functional illumination or general illumination, such as so-called corona illumination, it would be possible to do without separate illuminants, which would have to be arranged, for example, between the rotary actuator and the transparent layer and whose electrical supply would, for example, have to be arranged to penetrate through the pixel matrix display.

In one embodiment, the electronic pixel matrix display is a touch-sensitive, electronic pixel matrix display, preferably a touch-sensitive, electronic pixel matrix display with capacitive touch detection.

A preferred embodiment provides that the illumination surface is defined by the light outlet surface of the light guide. This means that the light guide defines the illumination surface; for example, the light guide is integrated into the rotary actuator.

The light guide is preferably rigidly connected to the actuating part. The light guide thus moves synchronously with the actuating part during rotational actuation. For example, a force-fitting and/or form-fitting connection between the actuating part and the light guide is provided. In a preferred embodiment, the electronic pixel matrix display is designed to provide a control of the electronic pixel matrix display dependent on the position of the rotary actuator, wherein only the region of the electronic pixel matrix display that is disposed below the rotary actuator and adjacently to the light inlet surface of the light guide is, for example, selectively controlled, i.e. is selectively illuminated, in order to eliminate the danger of undesired light emission.

According to a preferred variant, the light inlet surface is defined by a matrix, preferably lens elements assigned to the pixels. For example, a series or a matrix of converging lenses is provided as light inlet surface, the relative arrangement or distance of which corresponds to that of the pixel matrix.

In order to keep space available for other components inside the rotary actuator, such as a central additional light guide for a function display, the light guide has at least two reflection surfaces according to a preferred variant, so that the geometric light paths assigned to the pixels between the light inlet surface and the light outlet surface experience a directional deflection between 30° to 70°, for example 45°.

Preferably, at least one of the reflection surfaces has a curvature.

More preferably, at least one of the reflection surfaces has a curvature with an associated plane of curvature, wherein the geometric light paths assigned to the pixels are arranged between the light inlet surface and the light outlet surface in the plane of curvature. For example, a focusing of the light, captured by the light guide, of the several pixels as light sources is achieved. The light guide is preferably designed such that the minimum light intensity emitted from the light outlet surface is higher than the maximum light intensity incident on the light inlet surface.

According to a preferred embodiment, the light guide is arranged in such a way that no surface of the light guide or only the light outlet surface defines an outer surface of the actuating part; for example, except for the light outlet surface, the light guide is arranged in the volume defined by the actuating part. This arrangement makes it possible to dispense with a coating of the light guide made of opaque material in order to avoid undesired light emission due to the attenuation by the opaque material. For example, in an arrangement of the light guide on an outside of the actuating part, a coating of an outwardly facing surface of the light guide with opaque material is necessary. Such a coating has disadvantages because it impairs total reflection and thus lowers the intensity of the light exiting from the light outlet surface.

The light guide is preferably designed to be plane-symmetrical.

According to a preferred embodiment, the light guide has diffusely colored material. For example, the light guide is made of diffusely colored material. According to another embodiment, the light guide has the diffusely colored material only in certain regions. For example, the light guide is made of transparent material except for a diffusely colored region adjacent to the light outlet surface. Such a light guide is, for example, made of plastic in a 2K injection method. The light scattering caused by the diffuse coloration has the advantage that the light emission at the light outlet surface of the light guide becomes more consistent over this outlet surface despite the several pixels of the pixel matrix display to be regarded as approximately punctiform light sources, so that the pixel structure is no longer recognizable on the basis of the light distribution of the outlet surface, for example.

According to a preferred embodiment, the light guide has an end section extending up to the light outlet surface and two arms which branch off laterally with respect to an extension direction of the end section and on each of which a light inlet surface is formed. Preferably, the arms extend in a direction following the rotation direction or in a direction tangential to the rotation direction.

According to a preferred embodiment, the light guide is cone-shaped at least in certain sections, in particular the end section. It is preferably conically tapering in the direction of the geometric beam path directed toward the light outlet surface.

According to another embodiment, at least one central aperture is provided in the rotary actuator in order to enable visualization and/or optical projection by means of the electronic pixel matrix display through the aperture. For example, only one aperture is provided so that the operator can look through the aperture at the underlying partial region of the display and view the function symbol displayed thereon. According to a preferred embodiment of the arrangement, a light guide or a projection layer arranged in the aperture or an optics arranged in the aperture, such as a projection optics, is provided in the aperture. Optics are, for example, also understood to mean an image guide or a lens array of lenses arranged in a plane parallel to the display. A combination of the aforementioned elements can also be provided according to the disclosed embodiment.

The light guide, the projection layer and/or the optics are, for example, connected to the transparent layer in a form-fitting manner, for example by means of a bayonet connection. According to a preferred embodiment, the light guide, the projection layer and/or the optics are connected in a form-fitting or force-fitted manner to the transparent layer. For example, an adhesive connection and/or a latching connection is provided. Alternatively, the aforementioned elements may be formed integrally with the transparent layer.

For example, the integrality is achieved in a shaping process in a common injection step or in a multistage injection process.

According to a further embodiment, the bearing means comprise means for generating a latching haptics during a manual rotational adjustment of the rotary actuator, wherein these means for generating a latching haptics, for example, comprise a latching contour and a detent spring cooperating therewith.

The bearing means preferably comprise a sliding or rolling bearing, wherein its inner race, for example the inner raceway for the rolling elements or the inner slideway, is arranged toward the operator, generally upwardly, at an offset with respect to the transparent layer on a base, preferably an annular base, or the base defines an inner race of the sliding/rolling bearing, which is arranged toward the operator, generally upwardly, at an offset with respect to the transparent layer.

The disclosed embodiment further relates to the use of the above-described arrangement in one of its embodiments in a motor vehicle. For example, the arrangement is arranged in a center console of the motor vehicle.

The disclosed embodiment is explained in more detail with reference to the following figures. The figures are to be understood only as examples and merely constitute preferred design variants. Shown are:

Figure 1:
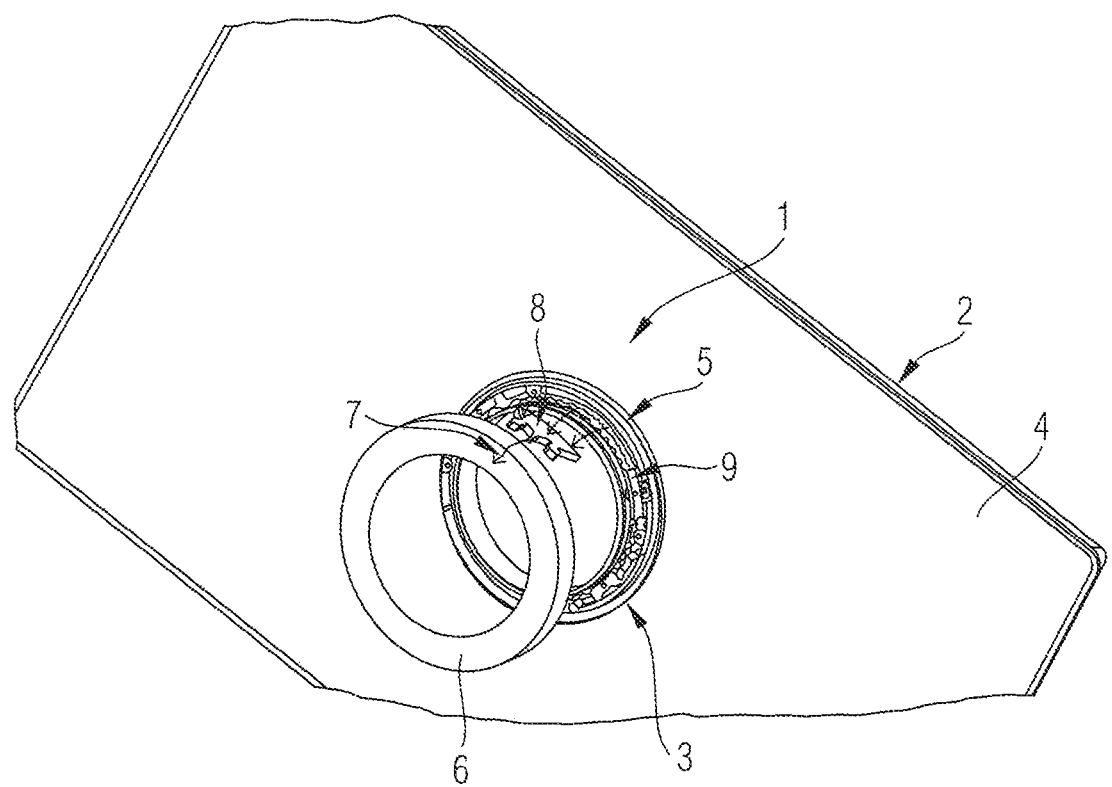
FIG. 1 is a perspective exploded view of a first embodiment of the arrangement according to the disclosed embodiment.

FIG. 1 shows a first embodiment of the arrangement 1 according to the disclosed embodiment. According to the disclosed embodiment, the arrangement comprises an electronic pixel matrix display 2 and a rotary actuator 3, which is arranged on the electronic pixel matrix display 2. The electronic pixel matrix display 2 has a lower layer structure, which is essentially used to visualize electronic data, for example to visualize a scale or a function symbol assigned to the functionality of the rotary actuator 3. In the present case, the layer structure is a conventional layer structure in TFT technology. The electronic pixel matrix display 2 is designed to be touch-sensitive; thus, a transparent adhesive layer and a transparent electrode array are, for example, provided to provide a capacitive spatially resolving touch sensor system. The electronic pixel matrix display has an upper transparent layer 4 of plastic, which defines an outer, here upper, surface on which the rotary actuator 2 is arranged. The rotary actuator 2 comprises an annular actuating part 6 made of opaque material and rotatably mounted on the transparent layer 4. The actuating part 6 is fastened, for example glued, to the transparent layer 4 by means of bearing means 5, in this case an annular base. The bearing means 5 also have a latching contour 9 which interacts with an actuating-part-side detent (not shown) in order to provide haptic feedback, here a latching haptics, during the rotational actuation of the actuating part 6. The rotary actuator 3 also has a light guide 8 which is rigidly connected to the actuating part 6 and thus synchronously movable with the actuating part 6 and which is designed to guide light from the electronic pixel matrix display 2, in particular from a selection of pixels dependent on the position of the actuating part 6, and thus of the light guide 8, to an illumination surface 7 arranged in the outer surface of the actuating part 6. These pixels belong to the region of the electronic pixel matrix display 2 arranged below the rotary actuator 3. For this purpose, the base 5 has a circumferential slot.

Figure 2:
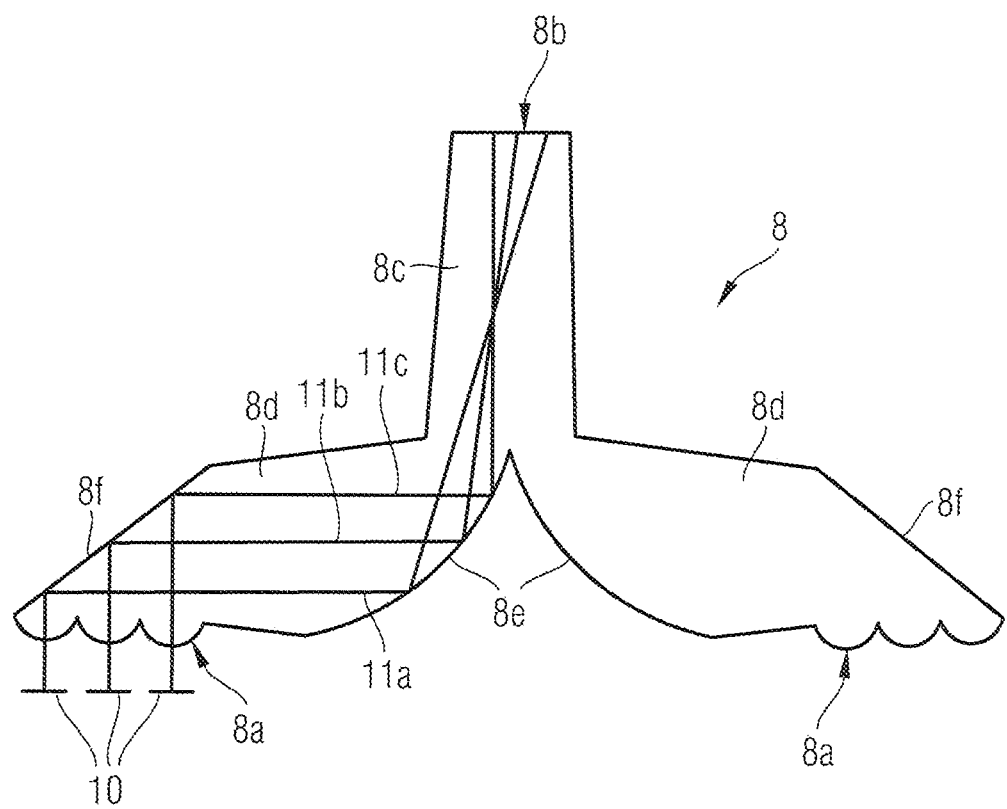
FIG. 2 is a sectional view through the light guide shown in FIG. 1 of the first embodiment of the arrangement according to the disclosed embodiment.

The structure of the light guide 8 which is made of transparent material and which is used in the first embodiment of FIG. 1 is explained in more detail with reference to FIG. 2. This light guide serves to guide light from several light inlet surfaces 8a to a light outlet surface 8b, wherein the latter defines the illumination surface 7 when arranged on the actuating part 6 of FIG. 1. The light outlet surface 8b belongs to an end section 8c of the light guide 8 tapering conically in the direction of the light outlet surface 8b. The light inlet surfaces 8a, each defined by an array of converging lenses and their arrangement and distance approximately corresponding to the array of immediately adjacent pixels 10 of the electronic pixel matrix display, are formed on lateral arms 8d of the light guide 8 opening into the end section 8c. For deflection and focusing of the light guided by the light guide 8, the course of which is respectively indicated by the geometric light paths 11a, 11b and 11c, planar surfaces 8f or curved surfaces 8e, which each act as reflective interfaces, are provided. The formation of the light guide 8 is selected such that the light of the several pixels 10 is captured via one or more light inlet surfaces 8a extended according to the arrangement of the pixels 10 and facing the pixels 10 and is focused onto a light outlet surface 8b reduced in comparison to the total extension of light inlet surfaces 8a in order to achieve light emission with comparatively high light intensity at this point without additional illuminants being required in addition to the electronic pixel matrix display 2.

Figure 3:
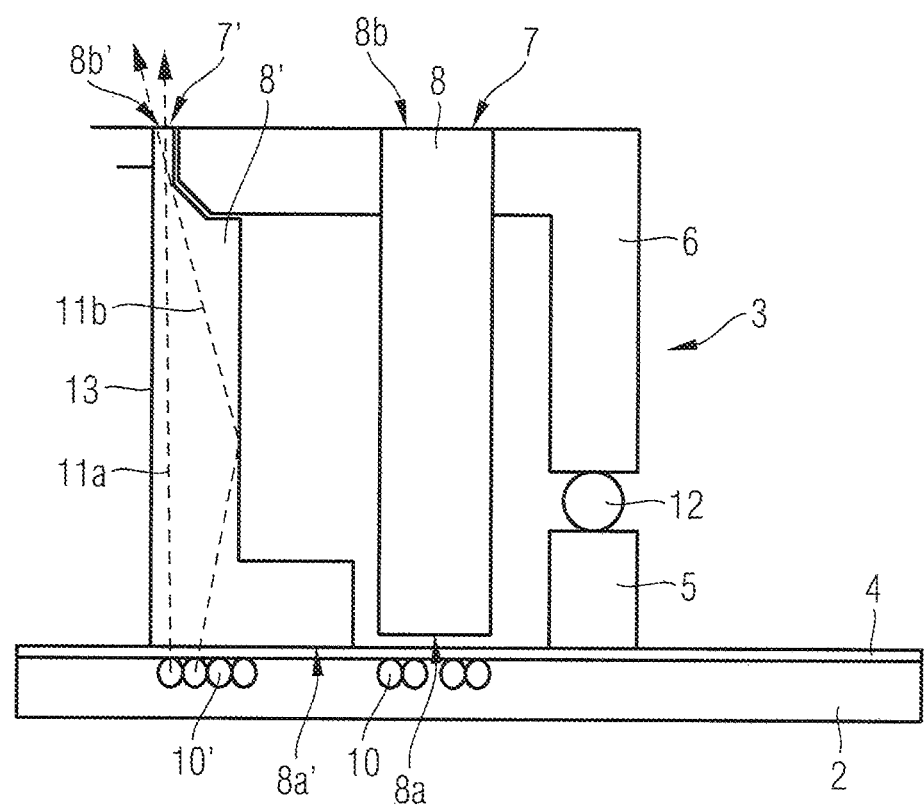
FIG. 3 is a partial sectional view through a second embodiment of the arrangement according to the disclosed embodiment.

FIG. 3 shows a second embodiment of the arrangement according to the disclosed embodiment. This embodiment comprises a rotary actuator 3. The rotary actuator 3 comprises an actuating part 6 which is rotatably mounted on a transparent layer 4 of an electronic pixel matrix display 2 by means of the bearing means embodied as rolling bearings 12, 5. A light guide 8' of transparent material is provided, which is glued to the transparent layer 4. It has a coating 13 of opaque material, for example an opaque paint, in order to avoid undesired light emission. The light guide 8' has a lower part defining a light inlet surface 8a' facing the pixels 10'. The light guide 8' is formed such that it guides the light captured from the pixels 10' in the direction of the light outlet surface 8b', optionally with reflection at the interfaces of the light guide 8'. For example, the light guide 8' is annular in shape and defines an annular circumferential, resting illumination surface 7 as so-called corona illumination. Furthermore provided is an additional light guide 8 of transparent material which captures light from the pixels 10 via its light inlet surface 8a facing the pixels 10 and guides it to the light outlet surface 8b, which defines an illumination surface 7 embedded in the surface of the actuating part 6. The additional light guide 8 is rigidly connected to the actuating part 6 and moves synchronously with the actuating part 6 while retaining a clear distance via the transparent layer 4 of the electronic pixel matrix display 2. The illumination surface 7 serves as an optically detectable position marking of the actuating part 6. In order to avoid undesired light emission, the region of the electronic pixel matrix display 2 located below the rotary actuator 3 is controlled in a position-dependent manner such that, aside from the pixels 10', only the pixels 10 are activated, which, depending on the position of the actuating part 6 or of the additional light guide 8, are arranged most closely adjacently to the light inlet surface 8a of the additional light guide 8.

What is claimed is:

1. A device, comprising:
   a rotary actuator;
   an electronic pixel matrix display comprising a transparent outer layer;
   wherein the rotary actuator comprises an actuating part and a detector configured to detect rotational position, wherein the actuating part is rotationally mounted by a bearing so that it can rotate about an axis of rotation along a rotation direction, and the rotary actuator is arranged on the transparent layer; and
   wherein the rotary actuator also comprises a light guide designed to guide light of several pixels of the pixel matrix display from a light inlet surface of the light guide to a light outlet surface of the light guide either in the direction of or into an illumination surface of at least one of the rotary actuator and the actuating part;
   wherein the light guide includes at least two reflection surfaces such that the geometric light paths assigned to the pixels between the light inlet surface and the light outlet surface experience a directional deflection between 30° to 70°; and
   wherein at least one of the reflection surfaces has a curvature with an associated plane of curvature, wherein the geometric light paths assigned to the pixels between the light inlet surface and the light outlet surface are arranged in the plane of curvature.

2. The device of claim 1, wherein the illumination surface is defined by the light outlet surface of the light guide.

3. The device of claim 1, wherein the light guide is rigidly connected to the actuating part.

4. The device of claim 1, wherein the light inlet surface is defined by a matrix of lens elements.

5. The device of claim 1, wherein the light guide is arranged in a volume defined by the actuating part.

6. The device of claim 1, wherein the light guide is designed to be plane-symmetrical.

7. The device of claim 1, wherein the light guide comprises diffusely colored material.

8. The device of claim 1, wherein the light guide is designed such that the minimum light intensity emitted from the light outlet surface is higher than the maximum light intensity incident on the light inlet surface.

9. The device of claim 1, wherein the light guide includes an end section extending up to the light outlet surface and two arms which branch off laterally with respect to an extension direction of the end section and on each of which a light inlet surface is formed.

10. The device of claim 9, wherein the arms extend in a direction following at least one of: the rotation direction and a direction tangential to the rotation direction.

11. The device of claim 1, wherein the light guide is cone-shaped in at least one section.

12. The device of claim 1, wherein the illumination surface is a surface closed circumferentially in the rotation direction.

13. The device of claim 1, wherein the device is configured to use in a motor vehicle.

14. A device, comprising:
a rotary actuator;
an electronic pixel matrix display comprising a transparent outer layer;
wherein the rotary actuator comprises an actuating part and a detector configured to detect rotational position, wherein the actuating part is rotationally mounted by a bearing so that it can rotate about an axis of rotation along a rotation direction, and the rotary actuator is arranged on the transparent layer; and
wherein the rotary actuator also comprises a light guide designed to guide light of several pixels of the pixel matrix display from a light inlet surface of the light guide to a light outlet surface of the light guide either in the direction of or into an illumination surface of at least one of the rotary actuator and the actuating part; and
wherein the light guide is rigidly connected to the actuating part.

15. A device, comprising:
a rotary actuator;
an electronic pixel matrix display comprising a transparent outer layer;
wherein the rotary actuator comprises an actuating part and a detector configured to detect rotational position, wherein the actuating part is rotationally mounted by a bearing so that it can rotate about an axis of rotation along a rotation direction, and the rotary actuator is arranged on the transparent layer; and
wherein the rotary actuator also comprises a light guide designed to guide light of several pixels of the pixel matrix display from a light inlet surface of the light guide to a light outlet surface of the light guide either in the direction of or into an illumination surface of at least one of the rotary actuator and the actuating part; and
wherein the light guide includes an end section extending up to the light outlet surface and two arms which branch off laterally with respect to an extension direction of the end section and on each of which a light inlet surface is formed.

16. The device of claim 15, wherein the arms extend in a direction following at least one of: the rotation direction and a direction tangential to the rotation direction.

17. A device, comprising:
a rotary actuator;
an electronic pixel matrix display comprising a transparent outer layer;
wherein the rotary actuator comprises an actuating part and a detector configured to detect rotational position, wherein the actuating part is rotationally mounted by a bearing so that it can rotate about an axis of rotation along a rotation direction, and the rotary actuator is arranged on the transparent layer; and
wherein the rotary actuator also comprises a light guide designed to guide light of several pixels of the pixel matrix display from a light inlet surface of the light guide to a light outlet surface of the light guide either in the direction of or into an illumination surface of at least one of the rotary actuator and the actuating part; and
wherein the light guide is cone-shaped in at least one section.

* * * * *